US011269925B2

(12) United States Patent
Martin et al.

(10) Patent No.: US 11,269,925 B2
(45) Date of Patent: Mar. 8, 2022

(54) DATA SYNCHRONIZATION IN A DATA ANALYSIS SYSTEM

(71) Applicant: INTERNATIONAL BUSINESS MACHINES CORPORATION, Armonk, NY (US)

(72) Inventors: Daniel Martin, Stuttgart (DE); Knut Stolze, Hummelshain (DE); Christian Michel, Sindelfingen (DE); Vassil Radkov Dimov, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 16/830,624

(22) Filed: Mar. 26, 2020

(65) Prior Publication Data

US 2020/0364240 A1 Nov. 19, 2020

(30) Foreign Application Priority Data

May 15, 2019 (EP) ...................................... 19174606

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC ............................ G06F 16/273; G06F 16/2379
See application file for complete search history.

(56) References Cited

U.S. PATENT DOCUMENTS

| 6,434,568 | B1 * | 8/2002 | Bowman-Amuah ....................... G06F 16/289 |
| 7,117,221 | B2 * | 10/2006 | Hahn ...................... G06F 16/27 707/624 |
| 9,501,501 | B2 | 11/2016 | Madhavarapu et al. |
| 10,180,946 | B2 | 1/2019 | Brodt et al. |
| 2016/0328461 | A1 | 11/2016 | Ahmed |
| 2017/0185493 | A1 | 6/2017 | Graefe |
| 2017/0329836 | A1 | 11/2017 | Simitsis et al. |
| 2017/0364571 | A1 | 12/2017 | Lu et al. |
| 2018/0046554 | A1 | 2/2018 | Griffith et al. |
| 2019/0361913 | A1 | 11/2019 | Yoon |

(Continued)

FOREIGN PATENT DOCUMENTS

CN 109241175 A 1/2019

OTHER PUBLICATIONS

Blrfl et al., What is a thread pool? Nov. 4, 2012 Stack Exchange, https://softwareengineering.stackexchange.com/questions/173575/what-is-a-thread-pool.*

(Continued)

*Primary Examiner* — Jason G Liao
(74) *Attorney, Agent, or Firm* — Anthony M. Pallone

(57) ABSTRACT

According to one embodiment, a method, computer system, and computer program product for data synchronization between a source database system and a target database system, the source database system including a source dataset and the target database system including a target dataset that is configured to include a copy of the source dataset. The embodiment may include configuring the target database system to detect data changes in the source dataset. The embodiment may include applying the detected data changes on the target dataset.

15 Claims, 5 Drawing Sheets

(56) References Cited

U.S. PATENT DOCUMENTS

| | | | |
|---|---|---|---|
| 2020/0034077 A1 | 1/2020 | Haravu | |
| 2020/0042183 A1 | 2/2020 | Meiri | |
| 2020/0272603 A1 | 8/2020 | Matters | |
| 2021/0103502 A1 | 4/2021 | Gurajada | |

OTHER PUBLICATIONS

Ben-Gan et al., Inside Microsoft SQL Server(D cent-symbol) 2005: T-SQL Querying 2006, Microsoft Press, p. 315+Bib Data, pp. 315-380.*

Microsoft KB Archive/238254 Nov. 21, 2003, betaarchive.com, https://www.betaarchive.com/wiki/index.php?title=Microsoft_KB_Archive/238254.*

Pitr-ch, Thread Pools Aug. 13, 2018, Github, https://github.com/ruby-concurrency/concurrent-ruby/blob/master/docs-source/thread_pools.md.*

Kholsa, Database Net Services Administrator's Guide Jul. 2017, Oracle Sys, 12c Release 1, https://docs.oracle.com/database/121/NETAG/dispatcher.htm#NETAG012.*

Oracle, "Oracle GoldenGate", printed Jan. 22, 2020, 6 pages, https://www.oracle.com/middleware/technologies/goldengate.html.

PostgreSQL, "Documentation: 9.1: Log-Shipping Standby Servers", Nov. 14, 2019, Chapter 25, High Availability, Load Balancing, and Replication, 3 pages.

Holliday et al., "Database Replication Using Epidemic Communication", Euro-Par 2000, LNCS 1900, pp. 427-434, 2000.

IBM: List of IBM Patents or Patent Applications Treated as Related (Appendix P), Mar. 27, 2020, pp. 1-2.

Pending U.S. Appl. No. 16/830,570, filed Mar. 26, 2020, entitled: "Method for Data Replication in a Data Analysis System", pp. 1-37.

Pending U.S. Appl. No. 16/830,696, filed Mar. 26, 2020, entitled: "Method for Data Synchronization Between a Source Database System and Target Database System", pp. 1-42.

Beier et al., "Method for Data Replication in a Data Analysis System," European Application No. 19174602.3, Application and Drawings, 31 pages.

Martin et al., "Method for Data Synchronization in a Data Analysis System," European Application No. 19174606.4, Application and Drawings, 31 pages.

Stolze et al., "Method for Data Synchronization Between a Source Database System and Target Database System," European Application No. 19174608.0, Application and Drawings, 34 pages.

* cited by examiner

DATA SYNCHRONIZATION IN A DATA ANALYSIS SYSTEM

BACKGROUND

The present invention relates to the field of digital computer systems, and more specifically, to a method for data synchronization in a data analysis system.

Many systems exist for moving data from one relational system to another. These systems can be classified into two categories: full refresh systems that copy entire data sets and change data capture (CDC) systems that optimize transfers by applying changes only. CDC systems enable a change data capture service that only the data in a source system of the CDC system that has actually changed are updated in a target system of the CDC system.

SUMMARY

Various embodiments provide a method for data synchronization in a data analysis system, computer system and computer program product as described by the subject matter of the independent claims. Advantageous embodiments are described in the dependent claims. Embodiments of the present invention can be freely combined with each other if they are not mutually exclusive.

In one aspect, the invention relates to a change data capture method for data synchronization between a source database system and target database system, the source data system comprising a source dataset and the target database system comprising a target dataset that is configured to comprise a copy of the source dataset. The method comprises: configuring the target database system to detect data changes in the source dataset and to apply the detected data changes on the target dataset.

In another aspect, the invention relates to a computer program product comprising a computer-readable storage medium having computer-readable program code embodied therewith, the computer-readable program code configured for data synchronization between a source database system and target database system, the source data system comprising a source dataset and the target database system comprising a target dataset that is configured to comprise a copy of the source dataset, by configuring the target database system to detect data changes in the source dataset and to apply the detected data changes on the target dataset.

In another aspect, the invention relates to a computer system for data synchronization between a source database system and target database system, the source data system comprising a source dataset and the target database system comprising a target dataset that is configured to comprise a copy of the source dataset. The computer system is configured for: configuring the target database system to detect data changes in the source dataset and to apply the detected data changes on the target dataset.

In another aspect, the invention relates to a target database system for data synchronization between a source database system and the target database system, the source data system comprising a source dataset and the target database system comprising a target dataset that is configured to comprise a copy of the source dataset. The target database system is configured for detecting data changes in the source dataset and applying the detected data changes on the target dataset. The target database system may for example be part of a CDC system comprising the source database system.

BRIEF DESCRIPTION OF THE DRAWINGS

In the following embodiments of the invention are explained in greater detail, by way of example only, making reference to the drawings in which.

DETAILED DESCRIPTION

Figure 1:
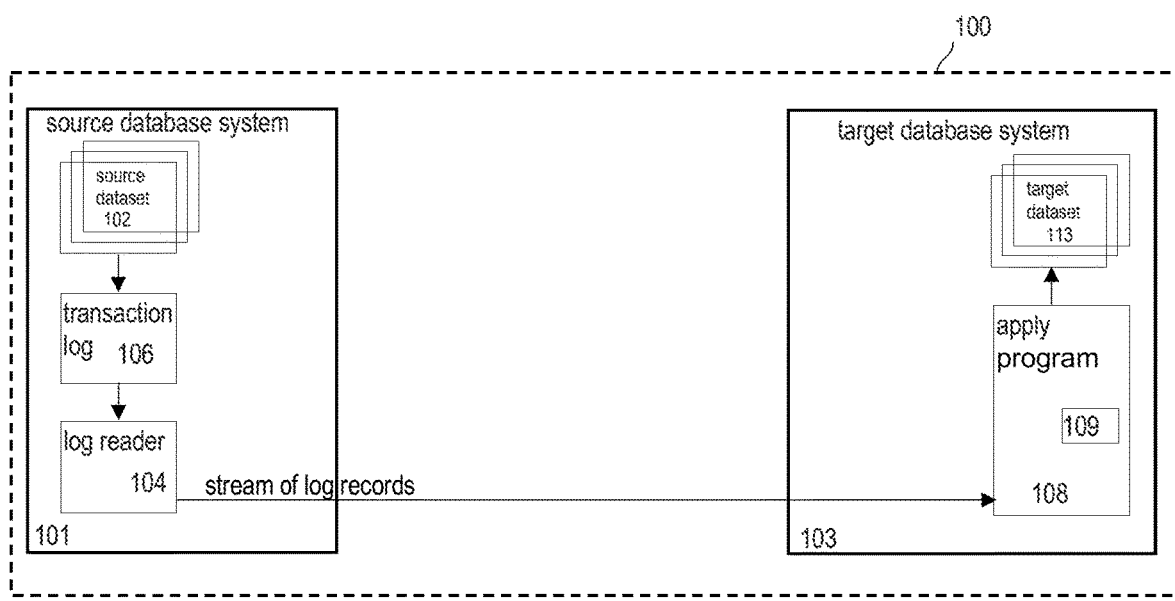
FIG. 1 is a block diagram of a data processing system, in accordance with an embodiment of the invention.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, the data analysis system may be a data warehousing system or master data management system. The data analysis system may enable data warehousing or master data management or another technique that uses a source and target database systems, wherein the target database system comprises a target database that is configured to receive/comprise a copy of a content of a corresponding source database of the source system. The source database system may be connected to the target database system via a connection. The connection may for example be a TCP/IP connection or another connection enabling the communication of data via the connection between the source database and the target database system. The source database system may be a transactional engine and the target database system may be an analytical engine. The transactional engine may have fewer processing resources compared to the second database engine. For example, the source database system may be an online transaction processing (OLTP) system and the target database system may be an online analytical processing (OLAP) system. By design, the source database systems have a low response time of few milliseconds, as opposed to analytic systems where the lowest response times are in seconds level. Thus, an update or enhancement on the source database system may have a significant and higher impact on the response time of the source database system compared to the target database system. It may become even impossible, for certain updates, to achieve for a single query at the source database system low desired response times. The present subject matter may solve this and may enable a change data capture replication process that is more efficient and that saves"

processing times at the source database system by processing the log information in accordance with the present subject matter.

The source dataset may be part of a source database and the target dataset may be part of a target database. The source and target databases may be supported by a change data capture replication. The source and target datasets may be stored in different format. The formats may differ in encryption, compression, row-oriented vs. column-oriented storage, etc. For example, the source dataset may be stored in a row-oriented format and the target dataset may be stored in a column oriented format. In other terms the target dataset is stored by column rather than by row. The detection of a change associated with a database transaction may comprise reading by the target database system a log record of the database transaction and identifying one or more data records or rows that are affected by the change. For each of the identified rows the target database system may determine a unique value that identifies the row such as the last name of a person (e.g. the unique value identifies the entity such as the person that is represented by the row) and that can be used by the target database system to identify in the target dataset column values which correspond or associated with said unique value. The target database system may apply the changes to that column values.

A database transaction may refer to a unit of work performed against a database and treated in a coherent and reliable way independent of other transactions. A database transaction generally represents any change in a database. For example, a database transaction may be issued to the database system in a language like SQL wrapped in a transaction, using a pattern similar to the following: s1) Begin the transaction, s2) Execute a set of data manipulations and/or queries, s3) If no errors occur then commit the transaction and end it and s4) If errors occur then roll back the transaction and end it. A transaction commit operation applies all data manipulations within the scope of the transaction and persists the results to the database. The processing step of the database transaction as described herein may be the steps s1) and s2) of the pattern, while the application step is the commit of the transaction so as to end it.

A log record refers to log information descriptive of a change induced by one or more operations of a database transaction performed on one or more data records of a source table of a database. For example, the log information is provided such that it can be used by the target database system to apply the same change on a target table that corresponds to the source table, e.g., if before applying the change to the source table, both the source and target tables have the same content, the log information may be provided such that the same change can be applied on the target table and the resulting target table has the same content as the changed source table by said change. The log information may, for example, comprise general log attributes and other attributes depending on the type of change associated with the log record. The general log attributes may, for example, comprise a log record sequence number (LRSN) which is a unique ID for a log record indicating the logical order of the change, a transaction ID number which is a reference to the database transaction generating the log record. The other attributes may comprise, for example, for an update change type, a page ID indicating the Page ID of the modified page, a length and offset of the page, before and after images which include the value of the bytes of page before and after the page change. The page may comprise one or more data records of the database. The before and after images may comprise values of that one or more data records before and after the change is applied respectively. Each data record that is referenced by the log record may be comprised of multiple attributes. Said data record may be uniquely identified, e.g., via an ID attribute, a set of key attributes in the corresponding database table, etc.

A data record or row is a collection of related data items such as a name, date of birth and class of a particular user. A data record represents an entity, wherein an entity refers to a user, object, or concept about which information is stored in the record. The data records may be stored in a graph database as entities with relationships, where each data record may be assigned to a node or vertex of the graph with properties being attribute values such as name, date of birth etc. The data records may, in another example, be data records of a relational database.

According to one embodiment, the method further comprises for each change of the data changes of the source dataset adding in a transaction log by the source database system a log information descriptive of the change of the source database system, and shipping by the source database system the transaction log to the target database system, wherein detecting the changes is performed using the transaction log at the target database system. The shipping of the transaction log may for example be performed asynchronously e.g. the shipping comprises asynchronously shipping by the source database system the transaction log to the target database system. The execution of the transactions may be performed while the transmission or shipping of the transaction log is being performed.

This embodiment may enable to use the source database system with lowest possible resource use. For example, if the source database system is pre-configured to operate in accordance with a given replication process using a capture component, that capture component may be (re)configured so that it can operate in accordance with the present subject matter. For example, the source database system may be pre-configured to use a write-ahead logging algorithm. This embodiment may configure this algorithm in accordance with the present subject matter so as to make the log files associated with the algorithm remotely available for the target database system. These files may be made remotely available by for example performing storage replication, filesystem snapshots (copy-on-write images) and/or shipping of log files. The shipping of log files may be advantageous as it may require less processing resources compared to other methods. For example, the shipping may be performed in an optimal way by enhancing the recovery log writing routines themselves of the capture component to use asynchronous I/O and a reasonably large buffer of the source database system to write recovery to a network socket. The additional memory may enable to decouple log reading and writing, but since the network I/O is asynchronous and the log write is to memory, there may be no measurable impact to latency or response time of transactional queries.

By performing the transaction log shipping, the target database system may be configured, in addition to applying changes to the target dataset, to perform at least one of the following steps using the shipped transaction log: log parsing and row image extraction, transaction management (a continuously running variant of roll forward recovery), staging, de-duplicating and micro-batching of transactions e.g. in commit order. This may further save resources at the source database system i.e. by performing as much operations of the CDC replication process at the target database system.

According to one embodiment, the data changes result from execution of one or more database transactions at the source database system, wherein execution of a database transaction is considered to be complete if a processing step followed by an application step of the database transaction is performed, the method further comprising receiving at the target database system log information indicative of the changes regardless if the database transactions are completed or not. This may further save resources at the source database system that would otherwise be required for monitoring when transactions are committed in order to ship the transaction log.

According to one embodiment, the method further comprises identifying committed and uncommitted transactions using the log information, assigning the uncommitted transactions to a thread pool and the committed transactions to a single thread, wherein the thread pool comprises a thread per processor core of the target database system. For example, each thread of the thread pool may be assigned a respective set of transactions, wherein transactions belonging to different sets of transactions are independent. The transactions of a set may be dependent transactions. A dependency between two transactions may for example be established when both transactions change (e.g. update or delete) the same data record. This may enable to make use of the hardware as much as possible by parallelizing work that has no strict order requirements, by using large amounts of memory for staging changes and lookup caches and fast disks to overflow staging queues if necessary.

According to one embodiment, executing the changes induced by said transections in parallel.

According to one embodiment, the method further comprises scheduling tasks for each thread of the threads is a respective queue, wherein the transactions are queued in accordance with the order of changes as occurred at the source database system.

According to one embodiment, the committed transactions being performed in accordance with a batch processing having scheduling time intervals. This may particularly be advantageous as an analytical engine, by design, may not be able to ingest a transactional workload profile at the same throughput and latency as it was produced. This embodiment employs a technique to shape and form the source workload in a way to make it better suitable for an analytical engine to process. In particular, batching may reduce the number of transactions the analytical side has to process e.g. committed consecutive source transactions are subsumed in one large target transaction. For example, the batch processing may use micro batches. A micro batch may be defined by certain duration of the scheduling time interval. The duration may be smaller than a predefined maximum duration so as to enable micro batching. For this scheduling time interval, the log reader may buffer all committed and uncommitted changes occurred during that time interval. All transactions that are part of the micro-batch may be applied on the target database in accordance with the present subject matter.

According to one embodiment, the method further comprises for each batch decomposing update operations into delete and insert operations and use the decomposed operations for the applying. This embodiment employs an additional technique to shape and form the source workload in a way to make it better suitable for an analytical engine to process. For example, every operation (insert, update, delete) itself has some rampup (initialization) cost associated to it. If the number of operations can be reduced, latency may be lower because of the overall reduced number of operations. Thus, by decomposing an update (e.g. a log record with undo and redo image) into a delete followed by an insert, update operations can be merged into delete and insert operations, reducing the number of operations per batch from three to two. Analytical systems often may not support native in-place update operations as they are built with an append only storage model. In this case, an update may internally be decomposed into a delete, insert pair. This may happen at the level of each individual operation. Decomposing updates before applying the changes increases the size of the insert and delete operations and therefore improves their efficiency as opposed to engine level operation granular decomposition.

According to one embodiment, the method further comprises for each batch determining if a row is changed multiple times by one or more transactions of the batch, and in response to determining that the row is changed multiple times by one or more transactions of the batch, performing only the last change on the row.

This embodiment employs an additional technique to shape and form the source workload in a way to make it better suitable for an analytical engine to process. For example, if the same row is changed multiple times within a transaction or across consecutive transactions that fell into one micro batch, changes to that row can be reduced to the final change. This may particularly be advantageous as inserting and subsequently updating a row is a common OLTP pattern. This embodiment may reduce the total number of changes required to be synchronized to the target and hence improve efficiency of the synchronization procedure.

According to one embodiment, the source dataset is stored in a row-structure format and the target dataset is stored in a column format. The applying comprises transforming the row to column format of the data changes using a row to column format pivoting routine of the target database system. This embodiment may maximize data synchronization throughput, as it may enable to do as little row level processing as possible. Using for example an existing analytical engine, the translation may directly be performed in the analytical engine, by adding native, transactional engine internal row format support to the analytical engine. This may efficiently be done as a column store engine already has highly tuned row to column format pivoting routines that are used for other purposes, which can be reused for this kind of translation.

According to one embodiment, the target database system comprises a target database management system, DBMS, wherein the detecting and applying is performed by the target DBMS. According to one embodiment, the source database system comprises a source database management system, DBMS, wherein the adding of and shipping is performed by the source DBMS. To minimize latencies induced by communication of capture component and apply component to respective database engines and to be able to use efficient interprocess and intraprocess communications means, this embodiment may enable to move much logic as possible into the database engines itself, and put the remaining, data synchronization specific parts collocated to the databases.

According to one embodiment, applying a change comprises determining the amount of data to be changed in the target dataset, and based on the amount performing the application by using multi-row data manipulation language (DML) statements or by processing data records of the data changes in bulks.

For example, the target database system may be configured to transfer large bulks of rows at once into the target database using interfaces which are in the form of utility programs (such as "load" or "ingest" in DB2), but may also be in the form of SQL syntax such as the Netezza "external table". These commands may have a relatively high (100s of milliseconds) startup overhead, which may be counterbalanced by providing large numbers of rows to get very low per row processing times. DML (insert, update, delete) statements offer multirow (or array) bindings. These typically have single digit millisecond overhead, but may get less efficient as the number of rows increases. This embodiment may enable to use multiple ways to apply changes to the database depending on the volume of data to be changed on a particular table. For low volume changes, regular, multirow DML statements are usually most efficient. For large volumes, bulk methods such as the external table may be used.

According to one embodiment, detecting change comprises parsing the shipped transaction log by a log parser of the target database system and assigning data changes by a transaction manager to a respective thread for performing the application.

The target database system may further be configured to keep recovery information of the synchronization process as a metadata table on the target database system. Since this table may be changed with every commit of a target apply operation, it may be kept in a separate, un-partitioned, tablespace on the target database to minimize the latency of any changes to it. Depending on the target database system, additional latency tuning options such as separating its buffer pool or even using row-major storage may be used as this is a very low cardinality table with heavy update traffic.

FIG. 1 is a block diagram of a data processing system (or data analysis system) 100 in accordance with an example of the present subject matter. The data processing system 100 may be configured for data synchronization between a source database system 101 and target database system 103 in accordance with an example of the present subject matter. The source database system 101 may, for example, be an online transaction processing (OLTP) system. The target database system 103 may for example, be an online analytical processing (OLAP) system. In one example, the data processing system 100 may be a change data capture (CDC) system. The communication between the source database system 101 and the target database system 103 may for example be performed via a TCP/IP communication layer.

The source database system 101 comprises one or more source dataset 102, a transaction log 106 and a log reader 104 (or capture component). Source dataset 102 can be relational tables in DB2® for z/OS®, DB2 for Linux, UNIX, and Windows, and Oracle. The transaction log 106 is maintained by the source database system 101 for shipping purpose in accordance with the present subject matter.

The entries or log records of the transaction log 106 describe changes to rows of the source dataset 102 at the source database system 101. More specifically, the entries in the transaction log 106 may for example contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction log entries for inserted rows may contain only new column values while transaction log entries for deleted rows may contain only old column values. Transaction log entries for updated rows may contain the new and old values of all row columns. The order of entries in the transaction log reflects the order of change operations of the transactions and the order of transaction commit records reflects the order in which transactions are completed. The type of row operations in transaction log records can be delete, insert or update.

The log reader 104 is configured to perform the log shipping of the transaction log 106 to the target database system 103. The transaction log 106 may for example comprise one or more log files. The log shipping may for example be performed on a periodic basis, e.g. every hour, or may be performed automatically as soon as a predefined amount of log records (e.g. 1000 log records) is saved in the transaction log 106. In each iteration, only the newly added log records with respect to the previous shipped log records may be shipped. In another example, the log reader 104 may be configured to delete the content of the shipped transaction log 106 and fill the transaction log 106 with new log records. In this case, in each iteration the whole transaction log 106 may be shipped to the target database system 103. The shipping may for example be performed by sending a stream of log records formed from log records of the transaction log 106. The log stream being shipped may for example be associated with as stream ID. The stream of log records may for example be a stream of merged log records. This may enable an efficient processing of the log records at the target database system.

The target database system 103 comprises an apply program 108 and one or more target dataset 113. Target dataset 113 can be relational tables in DB2® for z/OS®, DB2 for Linux, UNIX, and Windows, and Oracle. The apply program 108 includes one or more agent threads 109. The agent threads 109 may be used for processing transactions at the target database system 103 in accordance with the present subject matter. The target database system comprises a log streaming interface for receiving the log streams from the source database system 101.

Figure 2:
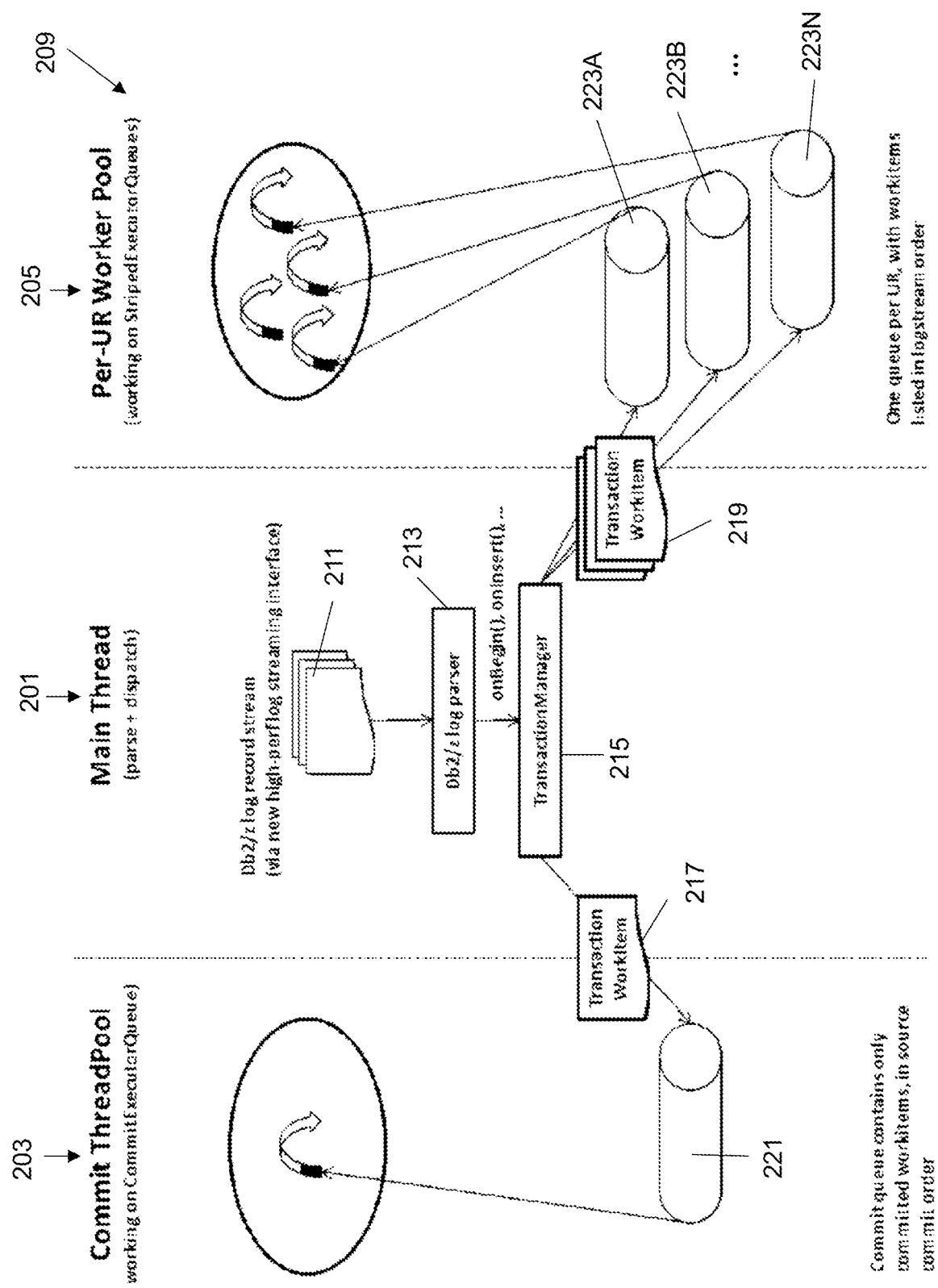
FIG. 2 is a diagram illustrating a method for applying changes at a target database system, in accordance with an embodiment of the invention.

The apply program 108 may be configured to receive streams of log records via the log streaming interface and to assign different transactions of the received log records to the one or more agent threads 109 in order to be applied to target dataset 113 of the target database system 103. FIG. 2 provides an example of processing the changes using the threads at the target database system 103.

The present system 100 may be advantageous for the following reasons. Source database systems such as transactional systems usually have years of fine-tuning operations into them. The fine-tuning operations may comprise finding the right balance between defining indices and their tradeoff with write performance. The fine-tuning operations may further comprise manufacturing statistics, using optimizer hints or statically bound packages for stable and optimal access plans across database upgrades. Thus, introducing changes into such systems may come at very high test and validation efforts. In particular, transactional response times are directly related to end user experience and cannot be compromised. The present subject matter may enable to solve this issue by performing the capturing of the changes at the target database system 103 instead of the source database system 101. Because of the large data volumes that need to be processed with every query request, analytical systems have typically large numbers of modern processors, memory and storage subsystems available. It is reasonable to assume that an analytical system has multiple times of hardware capacity at its disposal compared to its transactional peer. The present subject matter may enable that computational heavy operations required for data synchronization may be moved to the analytics side.

FIG. 2 is a diagram illustrating a method for applying changes at a target database system (e.g., target database system 103) in accordance with an example of the present subject matter. This may enable to perform the data synchronization in parallel.

For example, the apply program (e.g., apply program 108) of the target database system may comprise threads or agent threads 209. The threads 209 comprise a main thread 201. The main thread 201 may comprise a log parser 213 and a transaction manager 215. The main thread 201 may for example be launched by the apply program 108 in order to perform the parsing by the log parser 213 of received shipped log streams 211. The parsing of the log streams 211 may enable to identify transaction work items 217 which are committed and transaction work items 219 which are not committed yet at the source database system. The transaction manager 215 may be configured to dispatch the transaction work items 217 which are committed and the transaction work items 219 which are uncommitted using a thread pool 203 (named commit thread pool) and multi-thread pool 205 (named per UR worker pool) of the threads 209 as follows. The commit thread pool 203 may for example comprise one thread. The multi-thread pool comprises a thread per processor core (e.g. N threads) of the target database system. Each thread of the thread pools 203 and 205 may for example be associated with a respective processor core of the target database system.

Committed transactions are assigned to the thread pool 203 while uncommitted transactions are dispatched over the thread pool 205. Transactions assigned to each thread of the thread pools 203 and 205 may be scheduled in a respective queue 221 and 223A-N, wherein the transactions are queued in each of the queues 221 and 223A-N in accordance with the order of changes as occurred at the source database system. The queues 223A-N comprise independent transactions e.g. each transaction of each queue e.g. 223A is independent of transactions of the other queues 223B-N. And each queue of the queues 221 and 223A-N may or may not comprise dependent transactions. The order of changes may be defined by the order of changes within a single transaction and/or the order of changes of dependent transactions. E.g. if two transactions TR1 and TR2 (e.g. TR2 depends on the output of TR1) are dependent, the order of changes may be chosen so that the changes of TR1 to be performed before the changes of TR2. In addition, the changes of TR1 (TR2) may be performed following their order within TR1 (TR2) e.g. if TR1 has an insert followed by update, the insert is to be ordered before update change in the queue. In other terms, once a work is committed, strict commit order must be followed when applying the changes to the target database system. As a result, committed work is moved to the thread pool 203, where one thread processes work in strict commit order. And work of parallel, in progress transactions is offloaded to a the thread pool 205, with the number of threads managed by the pool 205 equal to the number of processor cores available to maximize hardware utilization and throughput.

Figure 3:
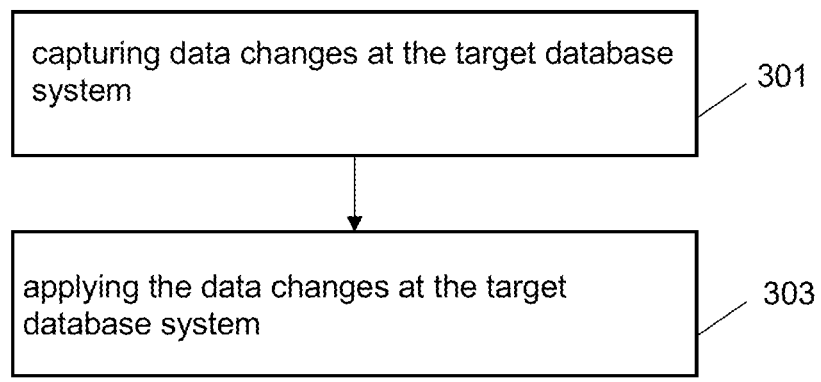
FIG. 3 is a flowchart of a method for data synchronization between a source database system and target database system, in accordance with an embodiment of the invention.

FIG. 3 is a flowchart of a method for data synchronization between a source database system (e.g., source database system 101) and a target database system (e.g., target database system 103). In step 301, the target database system may detect or capture data changes in the source dataset. For example, the target database system 301 may be configured to perform step 301 upon receiving log records from the source database system. The capture of the data changes may be performed using a log-based change data capture method. For example, the apply program 108 may capture data changes in the source dataset upon receiving log information from the source database system. The log information is descriptive of the data changes.

In one example, the source database system may comprise a capture component and the target database system may comprise an apply component. Each of the capture and the apply component may be configured to perform respective steps of a CDC replication process e.g. the capture component performs source steps of CDC replication process and the apply component performed the corresponding target steps of the CDC replication process. The CDC replication process enables to propagate the changes that occur on a data table at the source database system in order to be applied to a corresponding data table on the target database system. This may enable to have a consistent and synchronized content between the source and target database systems. The source database system may be configured so that the capture component do minimum number of operations for the propagation of the changes e.g. the capture component may configured to perform only a part of the source steps. For example, the capture component may only log changes in the transaction log and ship that transaction log on a regular basis to the target database system. And the target database system may be configured accordingly so as the CDC replication process can still be performed. For example, the apply component of the target database system may be configured to perform more operations, which are not performed anymore by the capture component e.g. the apply component may be configured to perform the target steps and the remaining part of the source steps that are not performed anymore by the capture component. In particular, the apply component may be configured to capture the change data from the shipped transaction log. For that, the data is parsed by a log parser of the apply component, change data is placed in a staging store at the target database system. The detected changes may be applied in step 303 by the target database system to the target dataset. For example, if a row is deleted from the source dataset 102, the target database system may detect in step 301 the change in a received log record associated with the deletion. For that, the target database system may identify the deleted row in the log record and may determine or search for a unique value that can identify the row in the source dataset. This unique value may then be used by the target database system to find column values that are associated with that unique value such that the target database system may apply the change on the found column values e.g. deletion of that found column values from the target dataset 113. After the data changes are applied to the target dataset related log information may be removed from the staging store.

Figure 4:
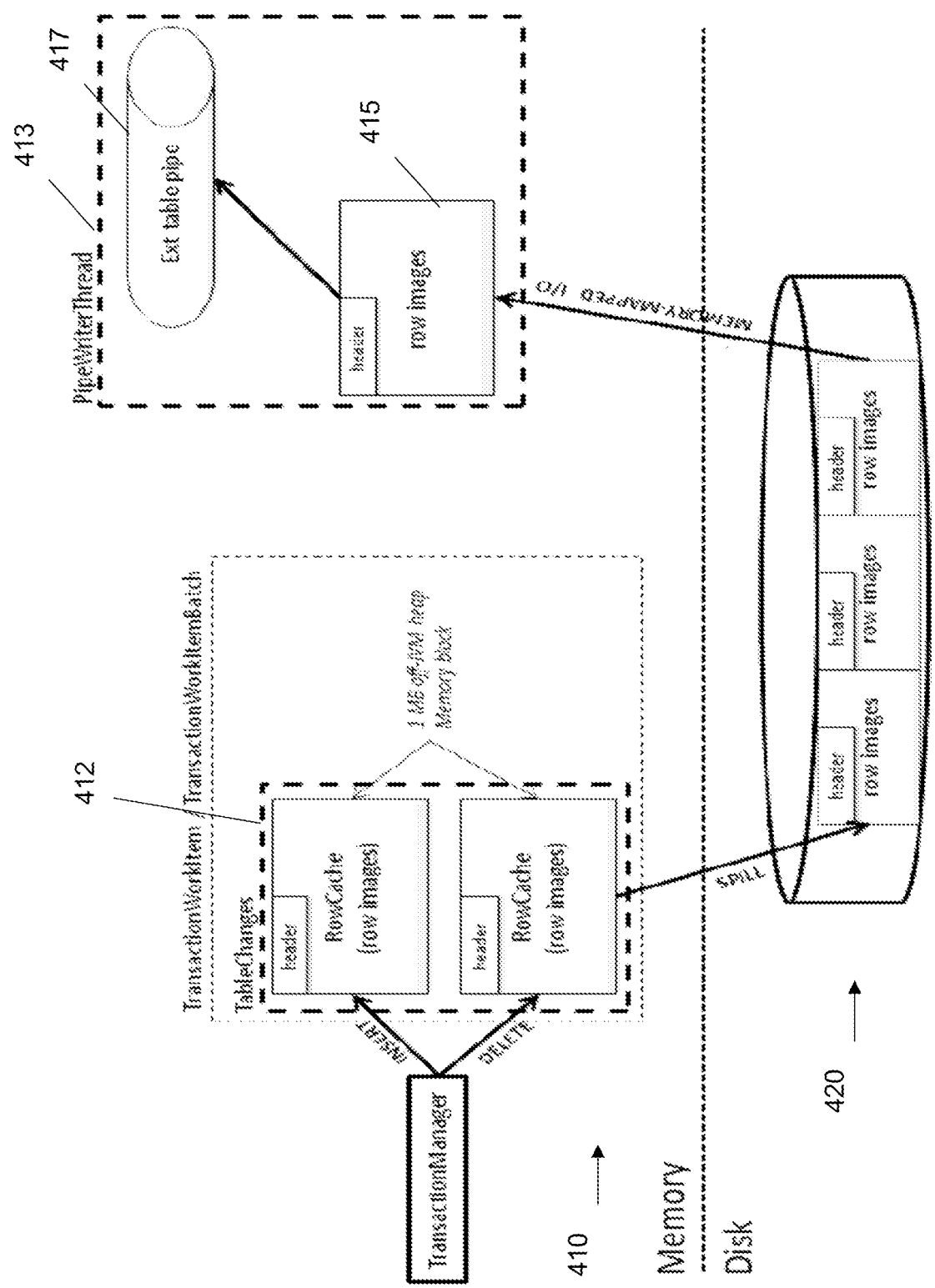
FIG. 4 is a diagram illustrating a method for processing rows at the target database system in order to apply data changes at the target data table, in accordance with an embodiment of the invention.

In another example, the source database system and target database systems may be configured (e.g. from scratch) so as to operate in accordance with the present method of FIG. 4. The databases of transactional systems are usually configured to store all changes in a transaction log in order to recover the committed state of the database should the database crash. The present method may take advantage of this aspect of the transactional database to use the logs in accordance with the present subject matter.

FIG. 4 is a block diagram illustrating a method for processing rows at a target database system (e.g., target database system 103), in order to apply data changes at the target dataset 113. For that row images may be extracted by a log parser (e.g., 213 of FIG. 2) from the shipped transaction log. A row image is a row having an exact reproduction or copy of values of a row or data record.

The row images are staged in blocks 412 (e.g., in 1 MB blocks) of unmodified row images in a memory 410, and written as is to the target analytical database. If more than 1 MB of memory is required for a table, changes are spilled to disk 420. The row images of a given table are then read by the thread 413 directly from the memory 410 and if a part of the row images of the table is spilled, the thread 413 may read that part from the disk 420. The read row images 415 may then be processed so as to convert them into a format that can be used in order to apply them to the tables (e.g., target dataset 113) of the target database system. For that, the read row images 415 may be read using a pipe 417. The row images after the pipe reading may be transformed into a column format so that to load them into column-organized tables (e.g., target dataset 113) of the target database system. This may enable an efficient processing of rows and may save processing time at the target database system. The source and target datasets are provided so that they only differ in their structure level e.g. row vs column and may not different on a value level. The difference on a value level may cover a different naming of the attributes or merging of two columns of the source in a column of the target etc. This may enable that all other possible kinds of row level translations, such as code page conversions, type coercion, etc., are being avoided by deliberately preventing table mappings outside of 1:1 source to target assignments (identity mapping).

Figure 5:
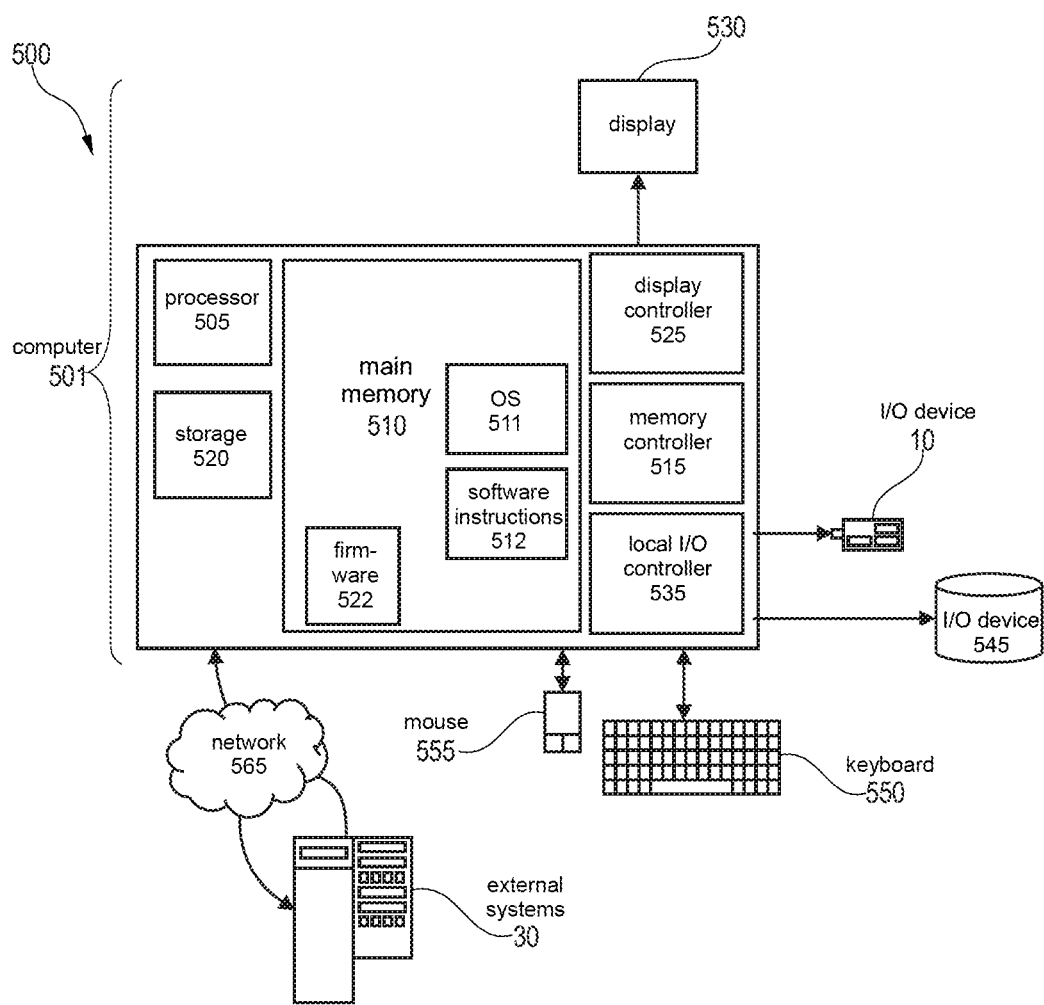
FIG. 5 represents a computerized system, suited for implementing one or more method steps as involved in the present disclosure, in accordance with an embodiment of the invention.

FIG. 5 represents a general computerized system 500 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software instructions 512, firmware 522, hardware (processor) 505, or a combination thereof. In exemplary embodiments, the methods described herein are implemented in software, as an executable program, and is executed by a special or general-purpose digital computer, such as a personal computer, workstation, minicomputer, or mainframe computer. The most general system 500 therefore includes a general-purpose computer 501.

In exemplary embodiments, in terms of hardware architecture, as shown in FIG. 5, the computer 501 includes a processor 505, memory (main memory) 510 coupled to a memory controller 515, and one or more input and/or output (I/O) devices (or peripherals) 10, 545 that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 545 may generally include any generalized cryptographic card or smart card known in the art.

The processor 505 is a hardware device for executing software, particularly that stored in memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 510 can have a distributed architecture, where various components are situated remote from one another, but can be accessed by the processor 505.

The software in memory 510 may include one or more separate programs, each of which comprises an ordered listing of executable instructions for implementing logical functions, notably functions involved in embodiments of this invention. In the example of FIG. 5, software in the memory 510 includes software instructions 512 e.g. instructions to manage databases such as a database management system.

The software in memory 510 shall also typically include a suitable operating system (OS) 511. The OS 511 essentially controls the execution of other computer programs, such as possibly software instructions 512 for implementing methods as described herein.

The methods described herein may be in the form of a source program, an executable program (object code), a script, or any other entity comprising a set of software instructions 512 to be performed. When a source program, then the program needs to be translated via a compiler, assembler, interpreter, or the like, which may or may not be included within the memory 510, so as to operate properly in connection with the OS 511. Furthermore, the methods can be written as an object oriented programming language, which has classes of data and methods, or a procedure programming language, which has routines, subroutines, and/or functions.

In exemplary embodiments, a conventional keyboard 550 and mouse 555 can be coupled to the input/output controller 535. Other output devices such as the I/O devices 10, 545 may include input devices, for example but not limited to a printer, a scanner, microphone, and the like. Finally, the I/O devices 10, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 545 can be any generalized cryptographic card or smart card known in the art. The system 500 can further include a display controller 525 coupled to a display 530. In exemplary embodiments, the system 500 can further include a network interface for coupling to a network 565. The network 565 can be an IP-based network for communication between the computer 501 and any external server, client and the like via a broadband connection. The network 565 transmits and receives data between the computer 501 and external systems 30, which can be involved to perform part or all of the steps of the methods discussed herein. In exemplary embodiments, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the software in the memory 510 may further include firmware 522 which may include a basic input output system (BIOS). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software instructions 512 stored within the memory 510, to communicate data to and from the memory 410, and to generally control operations of the computer 501 pursuant to the software. The methods described herein and the OS 511, in whole or in part, but typically the latter, are read by the processor 505, possibly buffered within the processor 505, and then executed.

When the systems and methods described herein are implemented in software instructions 512, as is shown in FIG. 5, the methods can be stored on any computer readable medium, such as storage 520, for use by or in connection with any computer related system or method. The storage 520 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data synchronization between a source database system and a target database system, wherein the source database system implements a change data capture system, and wherein the source database system comprises a source dataset, and wherein the target database system comprises a target dataset, and wherein the target dataset comprises a copy of the source dataset, the method comprising:
    configuring the target database system to detect data changes in the source dataset;
    receiving, at the target database system, log information indicative of the data changes regardless of whether database transactions are completed or not;
    identifying committed and uncommitted transactions using the log information; and
    applying the detected data changes to the target dataset, by assigning the uncommitted transactions to a multi-thread pool and assigning the committed transactions to a single-thread pool, wherein the single-thread pool is associated with a respective processor core of the target database system, and wherein the multi-thread pool is associated with respective multiple processor cores of the target database system, and wherein the multi-thread pool comprises a thread per available processor core of its respective multiple processor cores.

2. The computer-implemented method of claim 1, further comprising:
    for each detected data change, adding in a transaction log by the source database system a log information descriptive of the detected data change of the source dataset; and
    shipping by the source database system the transaction log to the target database system, wherein detecting the data changes is performed using the transaction log at the target database system.

3. The computer-implemented method of claim 1, wherein the data changes result from execution of one or more database transactions at the source database system, and wherein execution of a database transaction is considered to be complete if a processing step followed by an application step of the database transaction is performed.

4. The computer-implemented method of claim 1, wherein applying the detected data changes comprises executing the detected data changes in parallel using threads.

5. The computer-implemented method of claim 4, further comprising:
    scheduling transactions for each thread of the threads in a respective queue, wherein the transactions are queued in accordance with the order of changes as occurred at the source database system.

6. The computer-implemented method of claim 1, wherein the committed transactions are performed in accordance with a batch processing having scheduling time intervals.

7. The computer-implemented method of claim 6, wherein the committed transactions performed in accordance with the batch processing comprise update operations which are decomposed into delete and insert operations, and wherein the delete and insert operations are used in the applying of the detected data changes.

8. The computer-implemented method of claim 6, further comprising for each batch determining if a row is changed multiple times by one or more transactions of the batch, and in response to determining that the row is changed multiple times by one or more transactions of the batch, performing only the last change on the row.

9. The computer-implemented method of claim 1, the source dataset being stored in a row format and the target dataset being stored in a column format, the applying of the detected data changes comprising transforming the row format to column format of data records using a row to column format pivoting routine of the target database system.

10. The computer-implemented method of claim 1, the target database system comprising a target database management system, DBMS, wherein the detecting and applying is performed by the target DBMS.

11. The computer-implemented method of claim 2, the source database system comprising a source database management system, DBMS, wherein the adding of and shipping is performed by the source DBMS.

12. The computer-implemented method of claim 1, wherein applying a detected data change comprises determining the amount of data to be changed in the target dataset, and based on the amount performing the application by multi-row data manipulation language, DML, statements or by processing data records of the data changes in bulks.

13. The computer-implemented method of claim 2, wherein detecting the data changes comprises parsing the shipped transaction log by a log parser of the target database system and assigning data changes by a transaction manager of the target database system to a respective thread for performing the application.

14. A computer program product for data synchronization between a source database system and a target database system, wherein the source database system implements a change data capture system, and wherein the source database system comprises a source dataset, and wherein the target database system comprises a target dataset, and wherein the target dataset comprises a copy of the source dataset, the computer program product comprising:
    one or more computer-readable tangible storage devices and program instructions stored on at least one of the one or more computer-readable tangible storage devices, the program instructions executable by a processor capable of performing a method, the method comprising:

configuring the target database system to detect data changes in the source dataset;

receiving, at the target database system, log information indicative of the data changes regardless of whether database transactions are completed or not;

identifying committed and uncommitted transactions using the log information; and applying the detected data changes on the target dataset by assigning the uncommitted transactions to a multi-thread pool and assigning the committed transactions to a single-thread pool, wherein the single-thread pool is associated with a respective processor core of the target database system, and wherein the multi-thread pool is associated with respective multiple processor cores of the target database system, and wherein the multi-thread pool comprises a thread per available processor core of its respective multiple processor cores.

15. A computer system for data synchronization between a source database system and a target database system, wherein the source database system implements a change data capture system, and wherein the source database system comprises a source dataset, and wherein the target database system comprises a target dataset, and wherein the target dataset comprises a copy of the source dataset, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, wherein the computer system is capable of performing a method comprising:

configuring the target database system to detect data changes in the source dataset;

receiving, at the target database system, log information indicative of the data changes regardless of whether database transactions are completed or not;

identifying committed and uncommitted transactions using the log information; and applying the detected data changes on the target dataset by assigning the uncommitted transactions to a multi-thread pool and assigning the committed transactions to a single-thread pool, wherein the single-thread pool is associated with a respective processor core of the target database system, and wherein the multi-thread pool is associated with respective multiple processor cores of the target database system, and wherein the multi-thread pool comprises a thread per available processor core of its respective multiple processor cores.

\* \* \* \* \*